United States Patent
Dai

(10) Patent No.: US 10,890,280 B2
(45) Date of Patent: Jan. 12, 2021

(54) WATER PIPE WITH SYNCHRONOUSLY RETRACTABLE MULTI-LAYER

(71) Applicant: Songlin Dai, Taizhou (CN)

(72) Inventor: Songlin Dai, Taizhou (CN)

(73) Assignee: Zhejiang Helen Plastic Co., Ltd., Taizhou (CN)

( * ) Notice: Subject to any disclaimer, the term of this patent is extended or adjusted under 35 U.S.C. 154(b) by 0 days.

(21) Appl. No.: 15/961,815

(22) Filed: Apr. 24, 2018

(65) Prior Publication Data
US 2019/0093797 A1 Mar. 28, 2019

(30) Foreign Application Priority Data

Sep. 25, 2017 (CN) .......................... 2017 2 1235801
Dec. 22, 2017 (CN) .......................... 2017 2 1826273
Jan. 5, 2018 (CN) .......................... 2018 1 0011674

(51) Int. Cl.
| F16L 11/112 | (2006.01) |
| F16L 11/04 | (2006.01) |
| F16L 11/118 | (2006.01) |
| F16L 11/02 | (2006.01) |
| F16L 11/08 | (2006.01) |

(52) U.S. Cl.
CPC .............. *F16L 11/112* (2013.01); *F16L 11/02* (2013.01); *F16L 11/04* (2013.01); *F16L 11/088* (2013.01); *F16L 11/118* (2013.01)

(58) Field of Classification Search
CPC ......... F16L 11/118; F16L 11/11; A01N 59/00; B32B 1/08; B32B 3/28; B32B 5/024; B32B 9/025; B32B 9/047; B32B 25/10; B32B 17/12; B32B 2250/03; B32B 2262/02; B32B 2262/062; B32B 2262/08; B32B 2307/5825; B32B 2597/00; C25B 1/04; C25B 9/06
USPC .................................................. 138/118, 121
See application file for complete search history.

(56) References Cited

U.S. PATENT DOCUMENTS

| 6,279,614 B1 * | 8/2001 | Riesselmann | B32B 1/08 138/137 |
| 6,523,539 B2 * | 2/2003 | McDonald | A62B 7/14 128/205.25 |
| 6,955,189 B1 * | 10/2005 | Weyker | F16L 11/121 138/104 |
| 8,291,941 B1 * | 10/2012 | Berardi | F16L 11/20 138/109 |
| 9,709,194 B1 * | 7/2017 | Pan | F16L 11/20 |

(Continued)

*Primary Examiner* — Craig M Schneider
*Assistant Examiner* — David R Deal

(57) ABSTRACT

Disclosed is a water pipe with synchronously retractable multi-layer, comprising: a retractable inner pipe; a fabric sleeve sleeved outside the inner pipe, which is configured as a retractable cylindrical or corrugated one- or multi-layer fabric sleeve formed by interweaving retractable elastic yarns arranged at intervals in the axial direction and non-retractable reinforcing yarns arranged at intervals in the circumferential direction; and a retractable plastic film layer interposed between the inner pipe and the fabric sleeve. According to the present disclosure, the inner pipe, the plastic film layer and the fabric sleeve can be synchronously retracted under the effect of water pressure change, so that the frictional damage among multiple layers is effectively reduced, and the service life of the entire retractable water pipe is prolonged.

9 Claims, 8 Drawing Sheets

(56) References Cited

U.S. PATENT DOCUMENTS

| | | | | |
|---|---|---|---|---|
| 9,815,254 | B2* | 11/2017 | Blanchette | B32B 1/00 |
| 9,964,239 | B2* | 5/2018 | Disbrow | F16L 11/12 |
| 2012/0234425 | A1* | 9/2012 | Berardi | F16L 11/12 |
| | | | | 138/137 |
| 2013/0180615 | A1* | 7/2013 | Ragner | F16L 11/118 |
| | | | | 138/119 |
| 2013/0213514 | A1* | 8/2013 | Berardi | F16L 11/00 |
| | | | | 138/109 |
| 2014/0144533 | A1* | 5/2014 | Min | C02F 1/481 |
| | | | | 137/798 |
| 2015/0007902 | A1* | 1/2015 | Ragner | F16L 11/118 |
| | | | | 138/121 |
| 2016/0146379 | A1* | 5/2016 | LaTulippe | B32B 7/05 |
| | | | | 138/119 |
| 2016/0312928 | A1* | 10/2016 | Blanchette | F16L 11/10 |

* cited by examiner

WATER PIPE WITH SYNCHRONOUSLY RETRACTABLE MULTI-LAYER

TECHNICAL FIELD

The present disclosure belongs to the technical field of retractable water pipes, and in particular relates to a water pipe with synchronously retractable multi-layer.

BACKGROUND

In general, water pipes are needed for household car washing or garden watering. At present, the existing retractable water pipes are composed of an inner pipe at the inner layer and a fabric sleeve at the outer layer. The shortcomings of the existing retractable water pipes are as follows: first, the surface of the fabric sleeve at the outer layer is rough, and when the retractable water pipe is retracted under the effect of water pressure, the inner pipe rubs against the surface of the fabric sleeve and is prone to be damaged by friction, so that the service life is shortened; second, sharp gravel particles and plant prickles on the ground can pierce the fabric sleeve, so that the pressure-resistant effect of the fabric sleeve is lost, causing that the inner pipe is expanded and ruptured from the rupture of the fabric sleeve; third, with the broken of the outermost fabric sleeve, the sharp gravel particles and the plant prickles can directly contact the inner pipe, leading to the rupture of the inner pipe.

SUMMARY

The purpose of the present disclosure is to provide a water pipe with synchronously retractable multi-layer, which can service for with a long life.

The object of the present disclosure is achieved by a water pipe with synchronously retractable multi-layer, comprising: a retractable inner pipe; a fabric sleeve sleeved outside the inner pipe, which is configured as a retractable cylindrical or corrugated one- or multi-layer fabric sleeve formed by interweaving retractable elastic yarns arranged at intervals in the axial direction and non-retractable reinforcing yarns arranged at intervals in the circumferential direction; and a retractable plastic film layer interposed between the inner pipe and the fabric sleeve.

In some embodiments, an outer surface of the plastic film layer is fit with an inner surface of the fabric sleeve.

In some embodiments, the plastic film layer can be deployed or retracted along with the fabric sleeve.

In some embodiments, an inner surface of the plastic film layer is fit with an outer surface of the inner pipe.

In some embodiments, two ends of the water pipe are respectively connected to a pipe fitting, on which two ends of the inner pipe, of the fabric sleeve and of the plastic film layer are respectively fixed.

In some embodiments, the inner pipe is made of a composition of at least one retractable material selected from latex, silica gel, TPE(Thermoplastic Elastomer), TPR (Thermoplastic Rubber), TPU(Thermoplastic polyurethane), and TPX(Transparent Polymer X).

In some embodiments, the fabric sleeve is a straight cylindrical or corrugated one- or multi-layer fabric sleeve woven with chemical fiber threads, cotton threads or silk threads.

In some embodiments, the plastic film layer is made of a composition of at least one retractable material selected from latex, silica gel, TPE, TPR, TPU, TPX, PE(Polyethylene), PU(Polyurethane) and PP(Polypropylene).

Compared with the prior art, the present disclosure has the following prominent and beneficial technical effects.

Since the retractable plastic film layer with a smooth and low-friction surface is interposed between the inner pipe and the fabric sleeve, the frictional damage to the surface of the inner pipe is relatively small, and the contact between the rough-surfaced fabric sleeve and the inner pipe is blocked, so that the frictional damage to the inner pipe is reduced, and accordingly the service life of the entire retractable water pipe is prolonged.

The additional plastic film layer is made of a retractable material, and when the inner pipe and the fabric sleeve are retractable synchronously with the change of water pressure, the plastic film layer can also be retractable synchronously, so that the frictional damage among multiple layers inside the retractable water pipe structure is effectively reduced, and the service life of the entire retractable water pipe is prolonged.

The plastic film layer is also a kind of protective layer, which effectively protects the inner pipe from being easily damaged by sandstone inclusions and plant prickles that pierce the fabric sleeve, thereby prolonging the service life of the inner pipe.

The pressure bearing strength of the entire retractable water pipe is improved using the plastic film layer, so that the pressure resistance is increased, and the service life of the retractable water pipe is further prolonged.

The present disclosure is applicable to car washing, garden watering, home cleaning and other occasions.

DETAILED DESCRIPTION

The present disclosure will be further described in detail with reference to the accompanying drawings.

Figure 1:
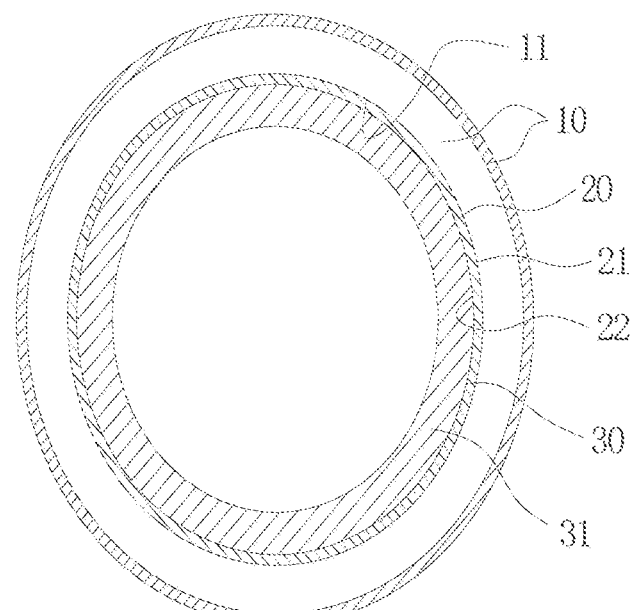
FIG. 1 is a transversal sectional view of the water pipe according to one embodiment of the present disclosure.
Figure 2:
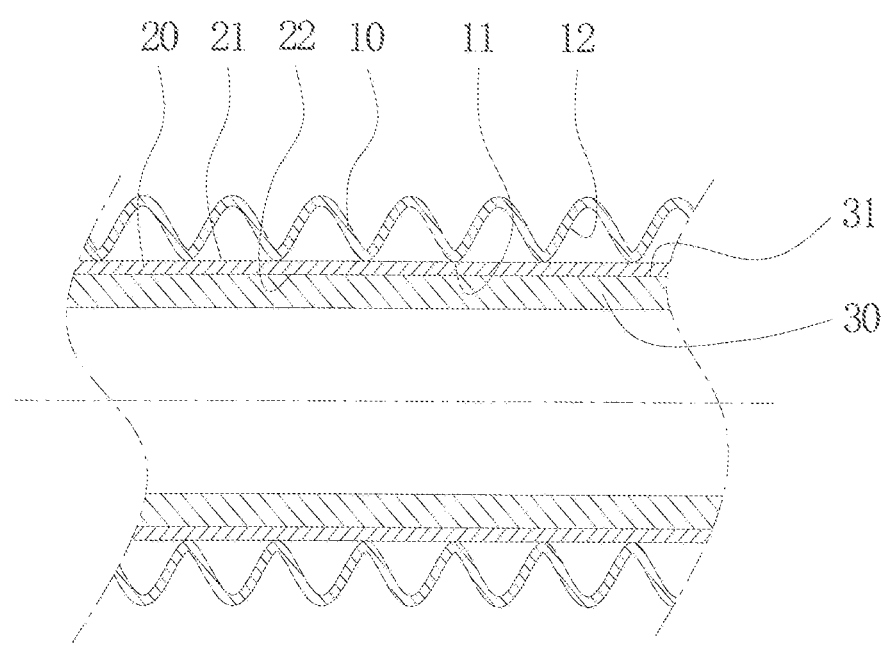
FIG. 2 is an axial sectional view of the water pipe according to one embodiment of the present disclosure.

FIGS. 1 and 2 schematically show an embodiment of a water pipe according to the present disclosure, in which FIG. 1 is a transversal sectional view and FIG. 2 is an axial sectional view. As shown in the figures, the water pipe includes a retractable inner pipe 30, an outer fabric sleeve 10, and a retractable plastic film layer 20 interposed therebetween. The fabric sleeve 10 is configured as a retractable cylindrical or corrugated one- or multi-layer sleeve pipe 10 formed by interweaving retractable elastic yarns arranged at intervals in the axial direction and non-retractable reinforcing yarns arranged at intervals in the circumferential direction. The reinforcing yarn consists of a plurality of reinforcing filaments (for example, chinlon reinforcing filament or dacron reinforcing filament or coarse denier polypropylene reinforcing filament or nylon 66 high-strength filament, etc.) twisted. In particular, the fabric sleeve 10 forms valleys (i.e. bottom points in a direction oriented towards the retractable plastic film layer 20) and peaks (i.e. top points in an opposite direction) in an axial direction of the pipe.

Under the effect of water pressure, the plastic film layer 20 can be deployed or retracted along with the fabric sleeve.

In this embodiment, an outer surface 21 of the plastic film layer 20 is fit with a surface 11 of a valley of the corrugated fabric sleeve 10. When the corrugated fabric sleeve 10 is deployed or retracted, the surface 11 of the valley of the fabric sleeve 10 is axially slidable on the outer surface 21 of the plastic film layer 20. Due to the small contact area of the surface 11 of the valley of the fabric sleeve 10 with the plastic film layer 20 as well as the smooth surface and the low friction of the plastic film layer, the friction damage to the plastic film layer caused by the fabric sleeve is reduced.

In other embodiments, the plastic film layer 20 may also be provided as a retractable corrugated plastic film layer. In this case, the outer surface 21 of the plastic film layer 20 is fit with the inner surface 12 of the corrugated fabric sleeve 10, and the bottom surface 22 of the valley of the plastic film layer 20 is fit with the outer surface 31 of the inner pipe 30. In this way, since the plastic film layer has a smooth surface with low friction, a small, contact surface with the inner pipe, and a configuration fit with the fabric sleeve, the plastic film layer has almost no friction with respect to the fabric sleeve 10, and has a very small friction with respect to the inner pipe 30, so that the damage to the inner pipe 30 due to the friction can be greatly reduced.

Figure 3:
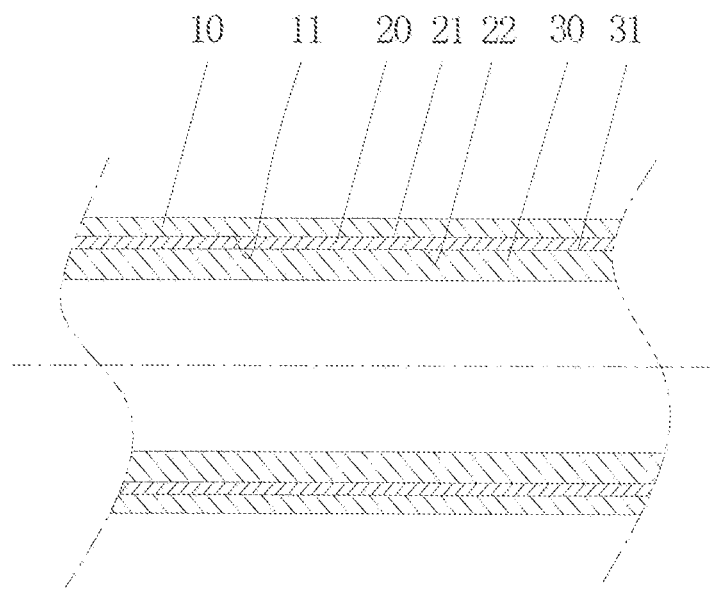
FIG. 3 is an axial sectional view of the water pipe according to another embodiment of the present disclosure, in which an outer surface of a plastic film layer is fit with an inner wall surface of a fabric sleeve.
Figure 4:
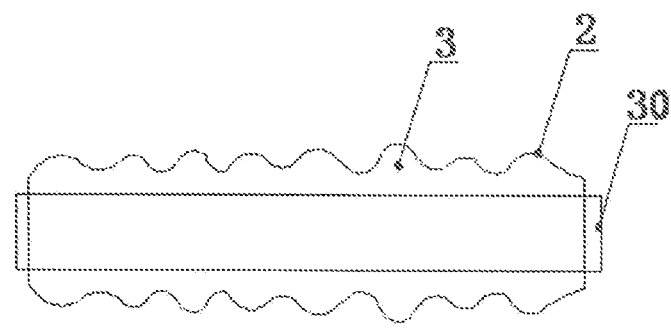
FIG. 4 is a simplified schematic structural view (planar section) of the water pipe with an inflator according to a further embodiment of the present disclosure.
Figure 5:
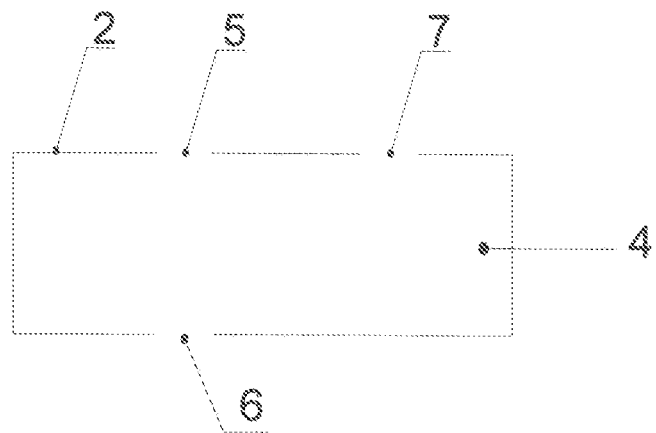
FIG. 5 is a simplified schematic structural view of a hollow box.
Figure 6:
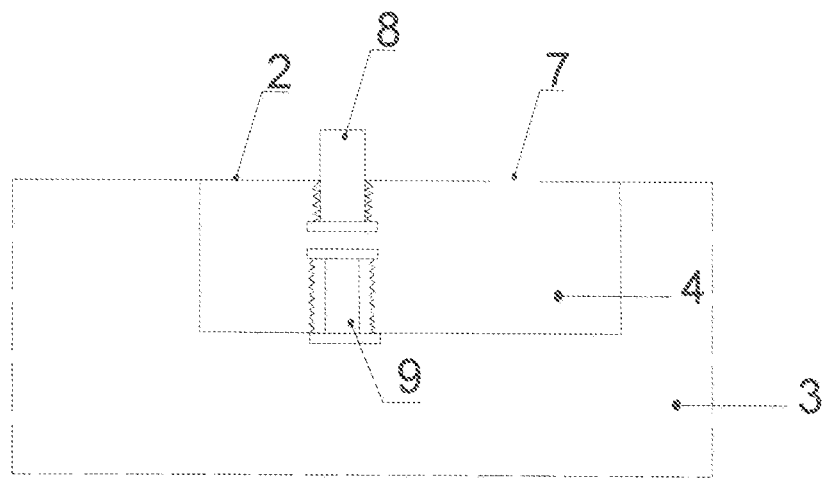
FIG. 6 is a simplified schematic structural view of the inflator in the retractable water pipe (showing a schematic view of a second opening in the closed state)
Figure 7:
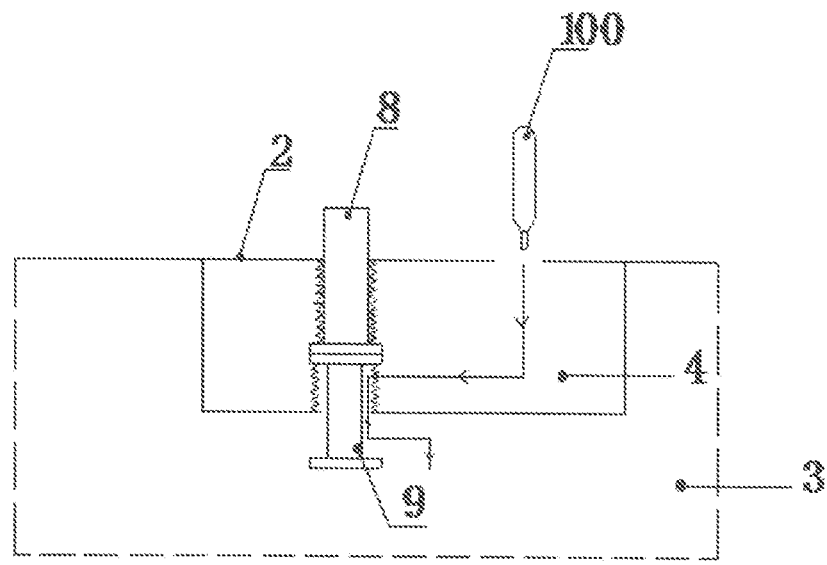
FIG. 7 is a simplified schematic structural view of the inflator in the retractable water pipe (showing a schematic view of the second opening in the open state, with the arrow indicating the direction of air flow)
Figure 8:
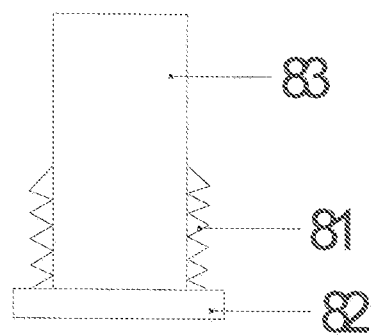
FIG. 8 is a schematic planar structural view of a switching member for a first opening.
Figure 9:
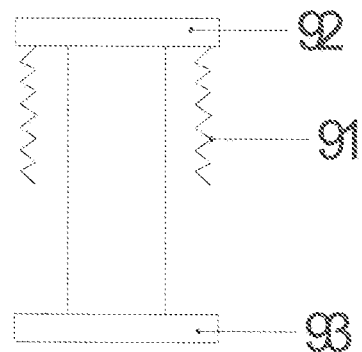
FIG. 9 is a schematic planar structural view of a switching member for the second opening.

FIG. 3 is another embodiment of the present disclosure, showing an axial sectional view in which the outer surface of the plastic film layer is fit with the inner surface of the fabric sleeve. As shown in the figure, the pipe includes a retractable inner pipe 30, an outer fabric sleeve 10, and a retractable plastic film layer 20 interposed therebetween. The fabric sleeve 10 is configured as a retractable cylindrical one- or multi-layer fabric sleeve 10 formed by interweaving retractable elastic yarns arranged at intervals in the axial direction and non-retractable reinforcing yarns arranged at intervals in the circumferential direction. Since the elastic yarn of the fabric sleeve 10 disposed in the axial direction is retractable, and the reinforcing yarn thereof disposed in the circumferential direction is not retractable, the fabric sleeve 10 can only be retractable in the axial direction and cannot be deployed or retracted in the radial direction, as the plastic film layer 20 and the inner pipe 30 are deployed or retracted. It is possible to prevent effectively the inner pipe 30 from bursting due to large pressure, and thus to improve the pressure bearing and resistance capability of the water pipe.

In this embodiment, an outer surface 21 of the plastic film layer 20 is fit with an inner surface 11 of the fabric sleeve 10, and an inner surface 22 of the plastic film layer 20 is fit with an outer surface 31 of the inner pipe 30. Under the effect of water pressure, the plastic film layer 20 can be deployed or retracted along with the fabric sleeve 10 and the inner pipe 30.

In some embodiments, two ends of the water pipe are respectively connected to a pipe fitting, on which two ends of the inner pipe 30, of the fabric sleeve 10 and of the plastic film layer 20 are respectively fixed, so as to facilitate connection to water sources, spray heads or other multi-layer retractable water pipes.

In some embodiments, the inner pipe 30 is made of a composition of one or more retractable materials selected from latex, silica gel, TPE, TPR, TPU, and TPX, and therefore has good retractility and elasticity.

In some embodiments, the fabric sleeve 10 is configured as a straight cylindrical or corrugated fabric sleeve woven with chemical fiber threads, cotton threads or silk threads, and therefore has a large supporting force.

In some embodiments, the plastic film layer is made a composition of one or more retractable materials selected from latex, silica gel, TPE, TPR, TPU, TPX, PE, PU and PP, and therefore has good elasticity.

In an embodiment where the plastic film layer 20 is not fit with the inner pipe 30, an inflator may be provided between the outer layer 2 (see FIG. 4), which is formed by the fabric sleeve 10 and the plastic film layer 20, and the inner pipe 30, so as to further reduce the friction against the inner pipe 30. After two ends of the inner pipe 30, of the fabric sleeve 10, and of the plastic film layer 20 are respectively fixed on the pipe fitting, an enclosed space 3 is formed between the outer layer 2 and the inner pipe 30. As shown in FIGS. 4, 5, 6, 7, 8 and 9, the inflator is disposed in the enclosed space 3 and located on the outer layer 2 formed by the fabric sleeve 10 and the plastic film layer 20. A structure is so provided that, inside the enclosed space 3 is disposed a hollow box 4 independent of the enclosed space 3, the top wall of the hollow box 4 is the inner side wall of the outer layer 2 formed by the fabric sleeve 10 and of the plastic film layer 20, the top wall of the hollow box 4 and a bottom wall opposite to the top wall are provided with a first opening 5 and a second opening 6 located opposite to each other. An inflation port 7 is also provided on the fabric sleeve 10 and in the vicinity of the first opening 5. The inflation port 7 is used to connect to an external gas source 100 (i.e. a device for storing gas source, such as a gas cylinder commonly used in the prior art, in particular a carbon dioxide gas cylinder may be used in this embodiment) and to inflate the hollow box 4. The second opening 6 is provided with a switch member 9 penetrating therethrough, and the switch member 9 is connected to a second elastic member 91. The second elastic member 91 serves to urge the switch member 9 to move up and down such that the second opening 6 is in the open and closed state. The first opening 5 is also provided with a switch member 8 penetrating therethrough. The switch member 8 is protruded from the first opening 5 and is extended out of the fabric sleeve 10. The switch member 8 is further connected to a first elastic member 81. The first elastic member 81 serves to urge the lower end 82 of the switch member 8 to be contacted with or be separated from the top end 92 of the switch member 9. In this structure, the first opening 5 is always in the closed state, and when the second elastic member 91 is not deformed, the second opening 6 is in the closed state.

The working principle of the above inflator is that, when the enclosed space 3 is not inflated, the second opening 6 is in the closed state. At this time, firstly the external air source 100 is connected to the inflation port 7, and then the switch member 8 is manually pressed down. The switch member 8 may move downward. The lower end 82 of the switch member 8 comes to contact with the top end 92 of the switch member 9. When the lower end 82 keeps move downward and presses down the switch member 9, the second elastic member 91 is compressed, and the second opening 6 is in the open state. The gas valve of the external gas source 100 is opened while the second opening 6 is in the open state, and the external gas source 100 leads to the enclosed space 3 through the inflation port 7, the hollow box 4 and the second opening 6, thereby realizing the inflation of the enclosed space 3. After the inflation is completed, the switch member 8 is released, and the first elastic member 81 and the second elastic member 91 are rebounded under the reaction force, so that the lower end 82 of the switch member 8 is separated from the top end 92 of the switch member 9. At this time, the switch member 9 moves upward until the second opening 6 is in the closed state. In this case, only the inflation port 7 needs to be sealed to prevent leakage of gas. In this way, the inflator can ensure that the elastic inner pipe 30 does not come into contact with the plastic film layer 20 during use of the retractable water pipe.

After the use of the retractable water pipe, if requiring deflation, the switch member 8 should be directly pressed, so that the lower end 82 of the switch member 8 is contacted with the top end 92 of the switch member 9. The switch member 8 is further pressed so that the second elastic member 91 is compressed and the second opening 6 is opened. At this time, open the inflation port 7 directly, the gas filled in the enclosed space 3 can be released through the second opening 6, the hollow box 4 and the inflation port 7.

Of course, in order to prevent the gas from leaking out through the inflation port 7 during inflation, in other embodiments, a one-way inflation valve may be provided on the inflation port 7, and a deflation port may be further provided on the fabric sleeve 10 and the plastic film layer 20, so that deflation can be achieved.

In this embodiment, the first opening 5 and the inflating port 7 are both located on the fabric sleeve 10 and the plastic film layer 20, close to the water outlet port. This arrangement facilitates the operator to inflate the retractable water pipe immediately after connecting the retractable water pipe to the water source, and the operation is quicker and more convenient. The inflator provided at the water outlet port is not affected by curling and storage of the water pipe, and it can be better maintained.

In this embodiment, the switch member 8 is composed of a cylinder 83 (a top end of the cylinder 83 is protruded from the surface of the first opening 5) penetrating the first opening 5 and of a plate 82 (i.e. lower end of the switch member 8 located inside the hollow box 4) perpendicular to a lower end of the cylinder 83. The switch member 9 is big at both ends but small in the middle, in which two ends of the switch member 9 can be used to block the second opening 6 so that the second opening 6 is in the closed state. The top end 92 of the switch member 9 is located inside the hollow box 4, the lower end 93 of the switch member 9 is located in the enclosed space 3, the first elastic member 81 (an extended spring in this embodiment) is disposed between the plate 82 and the top wall, and the second elastic member 91 (a compressed spring in this embodiment) is disposed between the top end 92 of the switch member 9 and the bottom wall.

In this embodiment, when the second opening 6 is in the open state (that is, during the deformation of the second elastic member 91 from minimum deformation to maximum deformation), the lower end 93 of the switch member 9 does not come into contact with the elastic inner pipe 30 (in this embodiment, the distance between the lower end 93 of the switch member 9 and the inner pipe 30 is 0.1-0.2 cm), so that the wear of the inner pipe caused by the friction between the switch member 9 and the inner pipe 30 is avoided.

Figure 10:
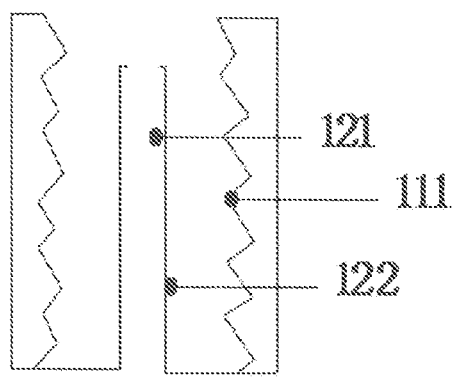
FIG. 10 is a schematic planar structural view of an inflation port of the inflator according to another embodiment.
Figure 11:
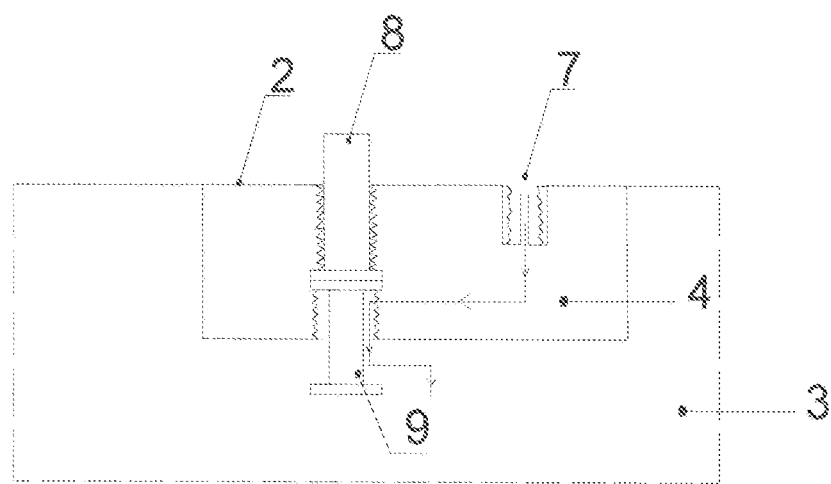
FIG. 11 is a simplified schematic structural view of the inflator in the retractable water pipe (showing a schematic view of the second opening in the open state, with the arrow direction indicating the direction of air flow, wherein some parts are not shown)

FIG. 10 shows a variation of the inflator. As shown in FIG. 10, in this embodiment, the inflation port 7 and the external gas source 100 above mentioned are further improved as follows. The inflation port 7 is provided with an internal thread 111 and a steel needle 122, and the steel needle 122 is provided with a gas inlet. The steel needle 122 is hollow, and the gas inlet is communicated with the hollow region 121 of the steel needle 122 and with the hollow box 4. The external gas source 100 used in this embodiment is a portable small, or tiny gas cylinder. When a portable small or tiny gas cylinder is used as an external gas source, the inflation principle thereof is as follows. Since the portable small or tiny gas cylinder is provided with an external thread, the external thread on the portable small or tiny gas cylinder is directly screwed cooperated with the internal thread 111 on the inflation port 7 during the use. During the screwing, the steel needle 122 on the inflation port 7 pierces the portable small or tiny gas cylinder, so that the gas inside the portable small or tiny gas cylinder is released and enters the hollow box 4 via the hollow region 121, thereby also achieving the inflation of the enclosed space 3 (as shown in FIG. 11). In this way, the inner pipe 30 does not come into contact with the plastic film layer 20. After the watering is completed, the deflation of the enclosed space 3 can be achieved by unscrewing the portable small or tiny gas cylinder.

Figure 12:
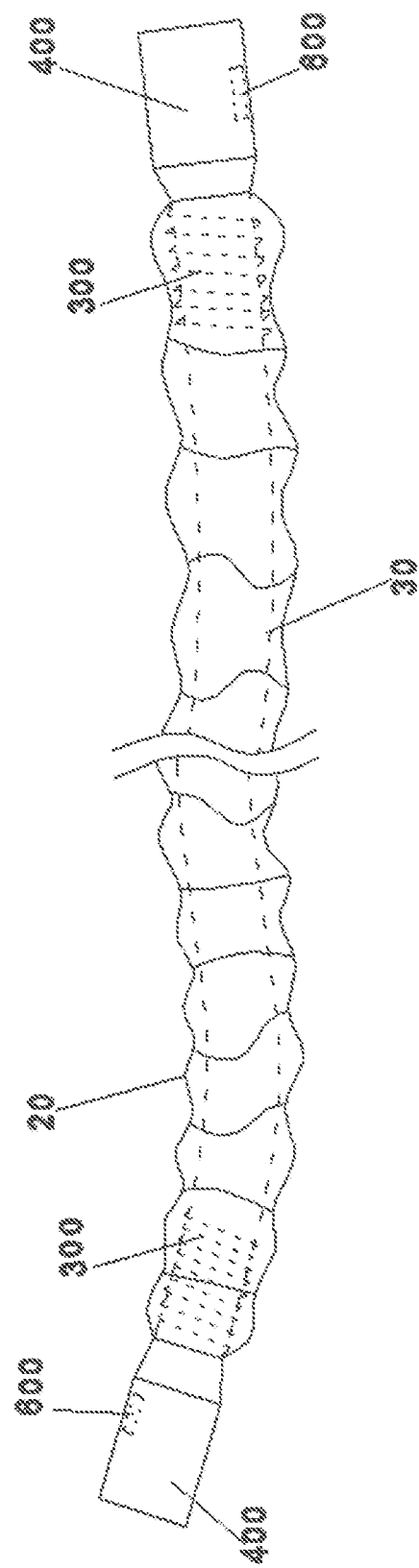
FIG. 12 is a schematic structural view of a water pipe for magnetized water with synchronously retractable multi-layer according to an embodiment of the present disclosure.
Figure 13:
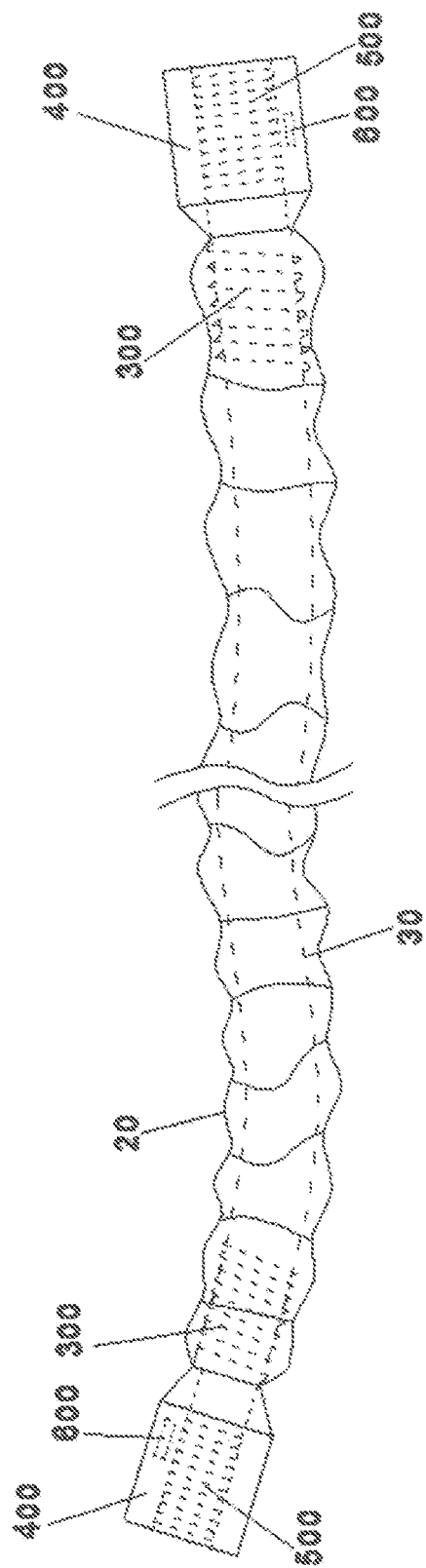
FIG. 13 is a schematic structural view of a water pipe for magnetized water with synchronously retractable multi-layer according to another embodiment of the present disclosure.

In a preferred embodiment, a magnetization device may also be provided on the aforementioned water pipe to achieve the magnetization of the water flowing through the water pipe. FIGS. 12 and 13 illustrate a water pipe for magnetized water with synchronously retractable multi-layer, in which the plastic film layer 20 is of a corrugated shape fit with the fabric sleeve 10.

As shown in FIG. 12, around the inner pipe 30 is sleeved a first magnetic member, which is located between the plastic film layer 20 and the inner pipe 30.

In this embodiment, the first magnetic member is an induction coil 300, which is sleeved on the inner pipe 30. The terminal of the induction coil 300 is led by means of a wire into the pipe fitting 400. The length of the wire shall be longer than the length of the fabric sleeve 10 after extended, to ensure that the induction coil 300 is not damaged when the fabric sleeve 10 is deployed. A gap is left between the induction coil 300 and the inner pipe 30 to ensure that the normal operation of the induction coil 300 is not affected when the inner pipe 30 is deployed or retracted. In this embodiment, the number of turns of the induction coil 300 is selected to be 20, and the magnetic field strength is 15,000 oersteds. In other embodiments, the number of turns and the magnetic field strength of the induction coil 300 may be adjusted according to the magnetization requirement and the length of the inner pipe 30. The induction coil 300 generates a magnetic field after energized, which can magnetize the water in the inner pipe 30. In the magnetized water, the original associative chain-like macromolecules are broken into individual small molecules, which break through the previously connected "molecular clusters" and become individual viable water molecules, so that the water becomes activated, and the biological activity is enhanced. The magnetized water can stimulate the flower plants themselves and promote photosynthesis and metabolism. Furthermore, the magnetized water can accelerate the conversion, of organic phosphorus and organic nitrogen in the soil into available phosphorus and available nitrogen that can be absorbed by flower plants, and can increase the fertility of the soil, thus promoting the dark green color, the thick stems and the developed root system of the flowers and improving their cold resistance and resistance to pests and diseases. In other embodiments, the first magnetic member may also be a cylindrical magnet, which may be sleeved around the inner pipe 30. A gap is left between the cylindrical magnet and the inner pipe 30 to ensure that the cylindrical magnet is not affected when the inner pipe 30 is deployed or retracted.

The installation position of the induction coil 300 may be located at the peak of the fabric sleeve 10 and of the plastic film layer 20, and a protective pipe may be sleeved around the induction coil 300 to ensure that the induction coil 300 is not affected when the fabric sleeve 10 is deployed or retracted.

As shown in FIG. 12, the number of the induction coils 300 is two, and two induction coils 300 are respectively sleeved on the left and right ends of the inner pipe 30. The terminal of the left induction coil 300 is led by means of a wire into the left pipe fitting 400, and the terminal of the right induction coil 300 is led by means of a wire into the right pipe fitting 400. The length of the induction coil 300 may be one-tenth of the length of the inner pipe 30 in the natural state, and it ensures the magnetization effect of the water by the induction coil 300. In other embodiments, the number, the arrangement and the length of the induction coil 300 can be adaptively varied based on the magnetization requirement and the length of the water pipe.

As shown in FIG. 12, in this embodiment, the power supply of the induction coil 300 adopts a rechargeable battery 600 that is electrically connected to the terminal of the induction coil 300 and provides electrical energy for the induction coil 300, wherein the rechargeable battery 600 is provided with a switch. The rechargeable battery 600 is installed inside the pipe fitting 400. The pipe fitting 400 is provided with a charging hole and an operating switch. In this case, the pipe fitting 400 can be customized, and the rechargeable battery 600 is waterproof-integrated in the pipe fitting 400. In other embodiments, the rechargeable battery 600 may also be directly mounted on the periphery of the pipe fitting 400. In other embodiments, the induction coil 300 can be directly connected to the power line, and the power line passes through the fabric sleeve 10 and the plastic film layer 20 and is electrically connected to the terminal of the induction coil 300. A socket of the power line may be installed on the fabric sleeve 3. When the magnetization of water is required by the user, one end of the power line is inserted directly into the socket of the power line on the fabric sleeve 3. The plug of the power line is connected to the external power socket to provide electric energy for the induction coil 4. When the magnetization of water is not required, the power line is not installed. In this way, it may provide two options of magnetization or non-magnetization for the user.

As shown in FIG. 12, a method for flower watering using the water pipe of the present disclosure is disclosed, comprising: mounting one pipe fitting 400 on the faucet; mounting another pipe fitting 400 on the spray gun; turning on the faucet, while energizing the induction coil 300 (by pressing the operating switch on the pipe fitting 400) to magnetize the water in the inner pipe 30. The user can also perform a power cut as needed, without magnetizing the water.

FIG. 13 schematically shows a structure of a water pipe for magnetized water with synchronously retractable multilayer according to another embodiment of the present disclosure.

As shown in FIG. 13, in comparison with the embodiment shown in FIG. 12, the water pipe in this embodiment further includes a second magnetic member 500 installed inside the pipe fitting 400 for further magnetizing the passing water. In this embodiment, the second magnetic member 500 also adopts an induction coil, wherein the number of turns of the induction coil is selected to be 15, and the magnetic field strength is 15,000 oersteds. In other embodiments, the number of turns and the magnetic field strength of the induction coil may be adjusted according to the magnetization requirement and the channel size of the pipe fitting 400. The induction coil surrounds the periphery of the water flow channel inside the pipe fitting 400. The rechargeable battery 600 is electrically connected to the terminal of the second magnetic member 500 (the induction coil), and the rechargeable battery 600 supplies the induction coil with electric energy. In this case, the pipe fitting 400 needs customization, and the induction coil is waterproof-integrated in the pipe fitting 400. In other embodiments, the second magnetic member may also adopt a cylindrical magnet that surrounds the water flow channel inside the pipe fitting 400 or the periphery of the water flow channel.

As shown in FIG. 13, a method for flower watering using the water pipe of the present disclosure is disclosed, comprising: mounting one pipe fitting 400 on the faucet; mounting another pipe fitting 400 on the spray gun; turning on the faucet, while energizing the induction coil 300 and the second magnetic member 500 (by pressing the operating switch on the pipe fitting 400). After water is passed through the inner pipe 30, the induction coil 300 and the second magnetic member 500 (induction coil) may magnetize the water in the inner pipe 30. The user can also perform a power cut as needed, without magnetizing the water.

In other embodiments, the first magnetic member and the second magnetic member may also be disposed between the plastic film layer 20 and the fabric sleeve 10 (e.g. in an embodiment, the plastic film layer 20 is fit with the inner tube 30 but is not fit with the fabric sleeve 10).

The various features in the above embodiments of the present disclosure may be applied individually or in any combination. The present disclosure does not limit specific combinations.

The above description only refers to some embodiments of the present disclosure. For a person of ordinary skill in the art, several variations and improvements may be made without departing from the concept of the present disclosure, and these are all within the protection scope of the present disclosure.

What is claimed is:

1. A water pipe with synchronously retractable multilayer, comprising:
   a retractable inner pipe, a fabric sleeve sleeved outside the inner pipe, which is configured as a retractable multi-layer fabric sleeve, the retractable fabric sleeve can only be retractable in an axial direction and cannot be deployed or retracted in a radial direction, along with the inner pipe, for the fabric sleeve is interwoven by using retractable elastic yarns in the axial direction and using non-retractable reinforcing yarns in a circumferential direction, and a retractable plastic film layer interposed between the inner pipe and the fabric sleeve;

wherein a shape of the retractable fabric sleeve is configured as a straight cylindrical tube with a smooth look or as a corrugated-looking tube forming valleys and peaks along the axial direction of the pipe, and the fabric sleeve can retract axially due to elasticity of the retractable elastic yarns used;

an outer surface of the plastic film layer is fit to an inner surface of the fabric sleeve when the fabric sleeve is configured as the straight cylindrical tube;

the outer surface of the plastic film layer is fit with a surface of the valleys of the fabric sleeve when the fabric sleeve is configured as the corrugated-looking tube.

2. The water pipe according to claim 1, wherein the plastic film layer can be deployed or retracted along with the fabric sleeve.

3. The water pipe according to claim 1, wherein an inner surface of the plastic film layer is fit to an outer surface of the inner pipe.

4. The water pipe according to claim 3, wherein an enclosed space is formed between the inner pipe and an outer layer which is formed by the fabric sleeve and the plastic film layer, an inflator is disposed in the enclosed space and located on the outer layer formed by the fabric sleeve and the plastic film player;

the inflator can be inflated or deflated, when inflated, the inflator can ensure that the inner pipe does not come into contact with the plastic film layer during use, so as to further reduce friction against the inner pipe.

5. The water pipe according to claim 1, wherein two ends of the water pipe are respectively connected to a pipe fitting, on which two ends of the inner pipe, of the fabric sleeve and of the plastic film layer are respectively fixed.

6. The water pipe according to claim 1, wherein the inner pipe is made of a composition of at least one retractable material selected from latex, silica gel, TPE, TPR, TPU, and TPX.

7. The water pipe according to claim 1, wherein the fabric sleeve is woven with chemical fiber threads, cotton threads or silk threads.

8. The water pipe according to claim 1, wherein the plastic film layer is made of a composition of at least one retractable material selected from latex, silica gel, TPE, TPR, TPU, TPX, PE, PU and PP.

9. The water pipe according to claim 8, wherein around the inner pipe is sleeved a first magnetic member, which is located between the plastic film layer and the inner pipe.

* * * * *